Sept. 2, 1941.   C. S. TRIGG   2,254,635
REFRIGERATING APPARATUS
Filed Nov. 4, 1938
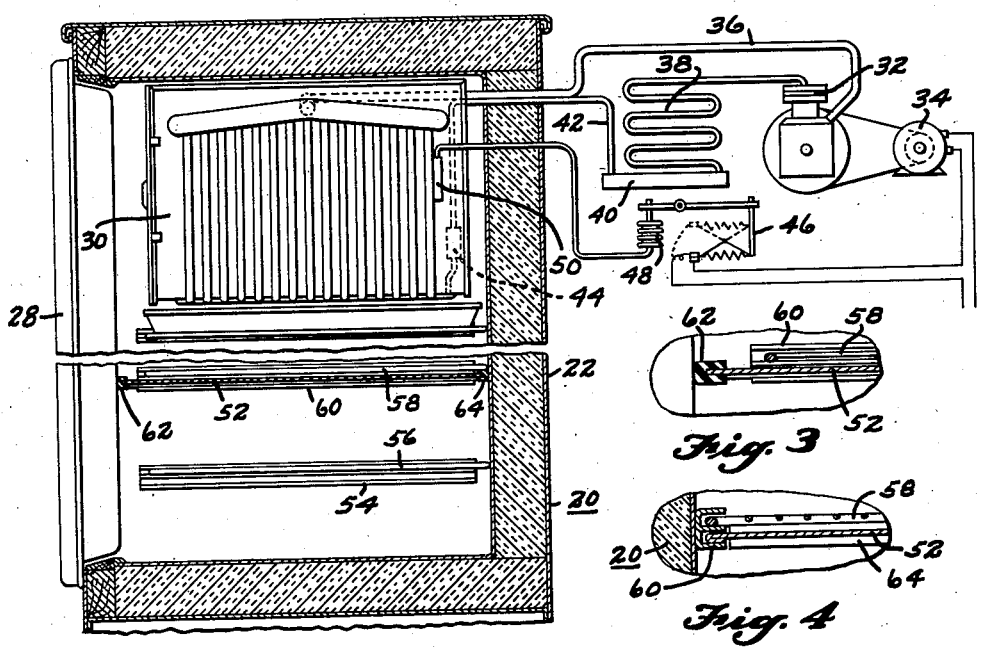
Fig. 1
Fig. 3
Fig. 4
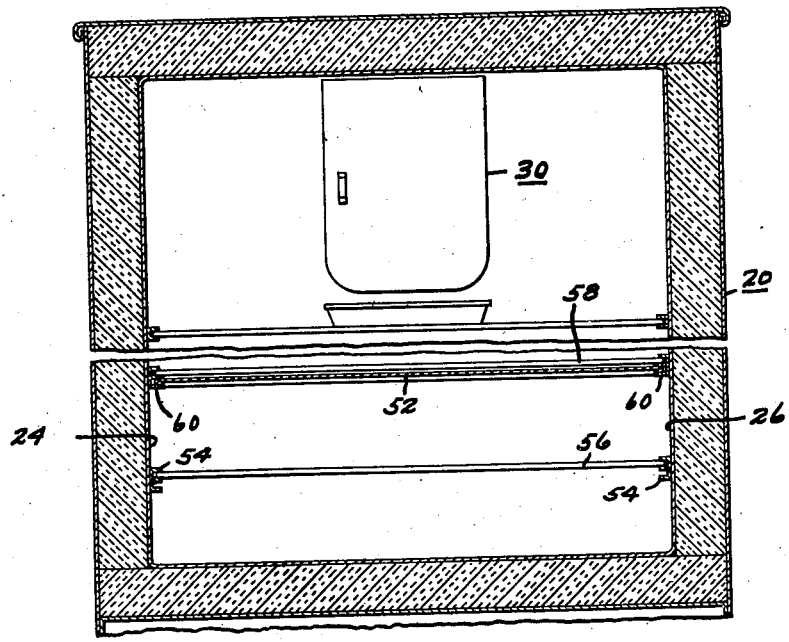
Fig. 2
INVENTOR.
BY Chester S Trigg
Spencer Hardman and Fehr
ATTORNEYS Patented Sept. 2, 1941

2,254,635

UNITED STATES PATENT OFFICE 2,254,635

REFRIGERATING APPARATUS

Chester S. Trigg, Dayton, Ohio, assignor to General Motors Corporation, Dayton, Ohio, a corporation of Delaware Application November 4, 1938, Serial No. 238,842

2 Claims. (Cl. 62—89)

This invention relates to refrigerating apparatus and more particularly to high humidity compartments for household refrigerators.

In the past it has been customary to use and to provide ventilated vegetable storage pans in household refrigerators. These ventilated storage pans were used for keeping vegetables and fruits. It has been demonstrated that such pans prevent wilting and will retain the crispness of vegetables and some fruits. Particularly they reduce the loss of moisture often found when vegetables are kept in other portions of the refrigerator. These properties are due to the fact that a high humidity and a restricted air circulation is maintained within the vegetable storage pans.

There have been numerous complaints that the space within these vegetables storage pans is too small at certain times. This is particularly true because of the fact that in many households most of the vegetables required for an entire week are purchased on Friday or Saturday. During the remainder of the week the amount of fruits and vegetables to be kept gradually reduce.

It is an object of my invention to provide a household refrigerator with a high humidity compartment of restricted ventilation which can be arranged to suit the varying requirements of the user.

It is another object of my invention to provide a household refrigerator with a high humidity compartment which can be easily changed to increase or decrease its size.

It is another object of my invention to provide a household refrigerator with means for changing the size of the high humidity compartment which will not require the removal of food from one or more of the shelves.

It is still a further object of my invention to make a household refrigerator cabinet more convenient and usable.

Further objects and advantages of the present invention will be apparent from the following description, reference being had to the accompanying drawing, wherein a preferred form of the present invention is clearly shown.

In the drawing:

Fig. 1 is a vertical sectional view of a household refrigerator cabinet embodying my invention;

Fig. 2 is another vertical sectional view of a household refrigerator cabinet taken at right angles to the view shown in Fig. 1;

Fig. 3 is a fragmentary view showing the seal between the partition and the door; and Fig. 4 is a fragmentary sectional view showing the edges of the shelf and the partition in guiding grooves on the side walls of the cabinet.

Briefly, I have shown a household refrigerator cabinet in which sliding shelf guides are provided beneath the two lower shelves so that a horizontal partition wall may be slipped beneath either one of these shelves so as to divide the food compartment into upper and lower sub-compartments. When the cabinet is open this partition may also be used as a utility shelf which may be pulled out from beneath one of the regular shelves and upon which articles may be placed when rearranging food within the cabinet. The partition wall may be inserted in the guides beneath either of the lower shelves so as to change the size of the lower sub-compartment in which a high humidity will be maintained.

Referring now to the drawing there is shown a household refrigerator cabinet 20 having a rear wall 22, side walls 24 and 26 and a door 28 which forms the front wall of the cabinet. All these walls, together with the top and bottom wall, are adequately insulated. Refrigerant evaporating means 30 is located in the upper part of the compartment enclosed by these walls and is provided with surfaces for cooling the air within the food compartment. The evaporator 30 also contains shelves or compartments for receiving ice trays in which ice may be frozen. This makes it necessary for the evaporator 30 to operate at temperatures below freezing in order to make it possible to freeze ice at any time.

The evaporating means 30 is supplied with liquid refrigerant from a liquefying apparatus which includes a compressor 32 driven by an electric motor 34 for withdrawing evaporated refrigerant from the evaporating means 30 through the suction conduit 36 and for compressing this evaporated refrigerant and for forwarding the compressed refrigerant to a condenser 38. The compressed refrigerant is liquefied in condenser 38 and is collected in a receiver 40 from which the liquid refrigerant is supplied through a supply conduit 42 under the control of a restrictor 44 or other suitable control device to the evaporating means 30. The temperature of the evaporating means is controlled by a snap acting switch means 46 connected in series with the compressor motor 34 and operated by a bellows 48 connected by a capillary tube to the thermostat bulb 50 mounted upon the evaporating means. In this way the liquefying apparatus is started and stopped according to predetermined high and low temperatures of the evaporating means 30.

The operation of the evaporating means at temperatures below freezing causes the humidity in the food compartment to be kept sufficiently low that vegetables and fruits lose moisture and wilt rather rapidly when exposed to this air in the food compartment. Therefore it has been customary to provide in the bottom of the refrigerator cabinet substantially closed vegetable storage pans which provide compartments in which moistened vegetables may be kept under conditions of high humidity and reduced ventilation in order that they may be kept firm and crisp. These pans derive their refrigeration from the cold air which falls from the evaporating means to the bottom of the food compartment and circulates around the vegetable pan. By isolating these vegetables in a separate compartment in this manner better conditions are provided for vegetables and some fruits.

I find that many families do considerable weekend buying and these vegetable storage pans under such conditions are not sufficiently large to accommodate all the vegetables under such conditions. To provide more vegetable pans would take up too much space in the refrigerator, since these pans are not economical in the use of space in the cabinet. I have therefore substituted a partition wall 52 which is supported upon sliding shelf guides beneath two or more of the regular shelves in the refrigerator cabinet. This sliding partition transforms the entire portion of the food compartment beneath it into a high humidity compartment which provides conditions similar to the conditions within the vegetable storage pans.

In the drawing dual shelf guides are provided for two or more shelves in the cabinet. One set of shelf guides, designated by the reference character 54, is provided upon opposite side walls of the cabinet has one set of slideways for receiving the lower shelf 56 and a second set of slideways immediately beneath the slideways for the shelf 56 which may be used to receive the partition wall 52 in case it is desired to reduce the size of the high humidity compartment.

The partition wall 52, as shown, however, is placed immediately beneath the shelf 58 and the partition wall 52 as well as the shelf 58 are mounted in adjacent slideways in the shelf guides 60 provided upon opposite side walls of the food compartment. At the front and rear edges, the partition wall 52 is provided with rubber gaskets 62 and 64 which may contact with the door and the rear wall of the food compartment when the door 28 is closed. This restricts the amount of ventilation between the portion of the food compartment above the partition wall 52 and the portion below the partition wall 52. Some ventilation, however, is provided since the shelf guides do not extend the entire length of the partition wall so that a limited amount of ventilation is provided at the corners of the partition wall. The partition wall is preferably made of some suitable thin metal such as aluminum, plated steel, or stainless steel. This permits refrigeration of the lower sub-compartment by permitting the heat entering the lower sub-compartment to be transmitted through the metal partition wall 52 to the cold air which circulates in the upper sub-compartment containing the evaporator 30.

Thus it is possible to use the entire space below the partition wall 52 for the storage of fruits and vegetables under substantially the same conditions of high humidity of restricted ventilation which are obtained in the ventilated vegetable storage pans. The partition 52 can be readily shifted from one position to another in order to change the size of this high humidity space. The partition 52 may be pulled out when the door is open so that articles may be placed thereon while the cabinet is being rearranged. If desired it is not necessary to provide a double set of shelf guides or slideways for the shelves and the partition, but the partition may be used in place of the ordinary shelf. Thus by the use of this partition I have provided a high humidity sub-compartment within a refrigerator cabinet which can be changed in size without difficulty.

While the form of embodiment of the invention as herein disclosed, constitutes a preferred form, it is to be understood that other forms might be adopted, all coming within the scope of the claims which follow.

What is claimed is as follows:

1. A refrigerating apparatus comprising in combination, a cabinet having a plurality of walls defining a food storage compartment therein, a cooling element of a closed refrigerant circulating system within said cabinet for chilling and causing circulation of air in said food compartment, a plurality of vertically spaced apart sets of supports on the side walls of said food compartment, a horizontally disposed shelf supported upon each of said sets of supports, said plurality of sets of supports being provided with means for receiving and supporting a partition independently of the shelves thereon and directly from the food compartment side walls, a partition supported by the means of one set of said supports below and in a horizontal plane closely adjacent the plane of the shelf supported thereon, said partition dividing said food storage compartment into upper and lower sub-compartments adapted to be maintained at different temperatures relative to one another, and said partition being removable from said one set of supports and receivable by the means on another set of said supports below the shelf supported thereon for changing the size of said sub-compartments.

2. A refrigerating apparatus comprising in combination, a cabinet having a plurality of walls defining a food storage compartment therein, a cooling element of a closed refrigerant circulating system within said cabinet for chilling and causing circulation of air in said food compartment, a plurality of vertically spaced apart sets of supports on the side walls of said food compartment, a horizontally disposed shelf supported upon each of said sets of supports, said plurality of sets of supports being provided with means for receiving and supporting a partition independently of the shelves thereon and directly from the food compartment side walls, a partition supported by the means of one set of said supports below and in a horizontal plane closely adjacent the plane of the shelf supported thereon for dividing said food storage compartment into upper and lower sub-compartments, said partition being removable from said one set of supports and receivable by the means on another set of said supports below the shelf supported thereon for changing the size of said sub-compartments, and said sets of supports being constructed and arranged to cooperate with the food compartment side walls and with said partition when supported thereon to limit the circulation of air between said sub-compartments whereby one sub-compartment is maintained at a higher temperature than the other sub-compartment.

CHESTER S. TRIGG.